United States Patent [19]

Tsutsumi et al.

[11] Patent Number: 4,918,552
[45] Date of Patent: Apr. 17, 1990

[54] CASSETTE TAPE RECORDER HAVING MEANS FOR PREVENTING CASSETTE VIBRATION DURING PLAYBACK/RECORDING

[75] Inventors: Yoshio Tsutsumi; Seiichi Suzuki, both of Saitama, Japan

[73] Assignee: Pioneer Electronic Corporation, Tokyo, Japan

[21] Appl. No.: 228,144

[22] Filed: Aug. 4, 1988

[30] Foreign Application Priority Data

Sep. 10, 1987 [JP] Japan ................................ 62-137619
Dec. 24, 1987 [JP] Japan ................................ 62-325301

[51] Int. Cl.$^4$ ............................................. G11B 15/68
[52] U.S. Cl. ................................... 360/96.5; 360/96.6; 242/199
[58] Field of Search ................. 360/96.5, 96.6, 85, 360/93, 95; 242/197–199

[56] References Cited

U.S. PATENT DOCUMENTS

| 4,345,283 | 8/1982 | Maryschka | 360/96.6 |
| 4,405,962 | 9/1983 | Haruta | 242/198 X |
| 4,716,477 | 12/1987 | Uehara | 360/96.5 X |
| 4,747,000 | 5/1988 | Godsoe | 360/96.6 |

FOREIGN PATENT DOCUMENTS

| 2919575 | 11/1979 | Fed. Rep. of Germany | 360/96.6 |
| 62-128054 | 6/1987 | Japan | 360/96.6 |
| 2183396 | 6/1987 | United Kingdom | 360/96.6 |

*Primary Examiner*—John H. Wolff
*Attorney, Agent, or Firm*—Sughrue, Mion, Zinn, Macpeak & Seas

[57] ABSTRACT

A cassette tape recorder is provided for suppressing vibration of a cassette during operation of the tape recorder by placing an elastic vibration suppressing sheet on the surface of a hiding plate. The surface of the suppressing sheet which faces the cassette includes a number of projections. In a second embodiment of the invention, a cassette stabilizer is provided having a device for opening and closing a door of the tape recorder, a pushing member for pushing the cassette placed in a housing of the door, and a pulling coupler which is disengaged from the push member when the door is opened, and which is engaged with the push member when the door is closed for shoving the push member onto the cassette.

14 Claims, 6 Drawing Sheets

CASSETTE TAPE RECORDER HAVING MEANS FOR PREVENTING CASSETTE VIBRATION DURING PLAYBACK/RECORDING

FIELD OF THE INVENTION

The present invention generally relates to a cassette tape recorder. More particularly, the present invention relates to a cassette tape recorder which suppresses vibration of the cassette during recording or playback.

BACKGROUND OF THE INVENTION

A conventional cassette tape recorder includes a recess in which a cassette is loaded. A hiding plate is attached at the back of the recess for hiding the internal mechanism of the tape recorder. The conventional tape recorder further includes a positioning pin and reel shafts which project from the hiding plate. A plate spring, or the like, is provided for pushing the cassette at a first side thereof which is opposite to the side of the cassette having a magnetic head insertion opening. When the cassette is loaded in the recess, the reel shafts are inserted into the cassette's reel hubs, and the tip of the cassette positioning pin is inserted into an associated positioning hole in the cassette to thereby position the cassette. At this time, the cassette is pushed at the bottom thereof by the plate spring.

If the conventional cassette tape recorder is of the so-called kangaroo pouch type in which a cassette housing is formed in a door, the cassette is loaded in the recess of the recorder by turning the door into the body of the recorder, so that the cassette is pushed towards the hiding plate by a plate spring provided in the door.

Although the cassette is positioned by the cassette positioning pin and is elastically held by the plate spring in the above-mentioned conventional cassette tape recorder, this arrangement has a problem in that the cassette is vibrated during the rotation of the reel shafts during playback and recording. As a result, the cassette vibrates and resonates around a vibration frequency of about 500 Hz as shown by a dotted line in FIG. 1, thereby making a chatter noise during recording or playback. Further, the vibration of the cassette causes the wow and flutter characteristics of the recorder to deteriorate during recording and playback.

SUMMARY OF THE INVENTION

The present device was made in order to solve the above-mentioned cassette vibration problem.

Accordingly, it is an object of the present invention to provide a cassette tape recorder in which the vibration of the cassette during the operation of the recorder is absorbed to prevent chatter during playback or recording.

It is another object of the present invention to maintain the wow and flutter characteristics of the recorder, thereby heightening fidelity of recording and playback.

The present invention accomplishes these objects by providing a cassette recorder, wherein an elastic vibration suppressing sheet, such as a rubber sheet, is positioned on the front surface of the hiding plate. The surface of the elastic sheet which faces the cassette is provided with a plurality of projections to dampen the vibration of the cassette during recording and playback.

The present invention has still further objects of reducing the motive power of a motor in a tape recorder utilizing the elastic vibration suppressing sheet, and which still accurately positions the cassette in the tape recorder.

These further objects are accomplished by a second embodiment of the present invention which provides a tape recorder stabilizer for a tape recorder having motor means for opening and closing a door including a housing for a cassette; a push member providing in the housing; and a pulling coupler which is disengaged from the push member when the door is opened and which is engaged with the push member when the door is closed to thereby shove the push member against the cassette.

PREFERRED EMBODIMENTS OF THE INVENTION

A first embodiment of the present invention will now be described in connection with FIGS. 2-4.

Figure 2:
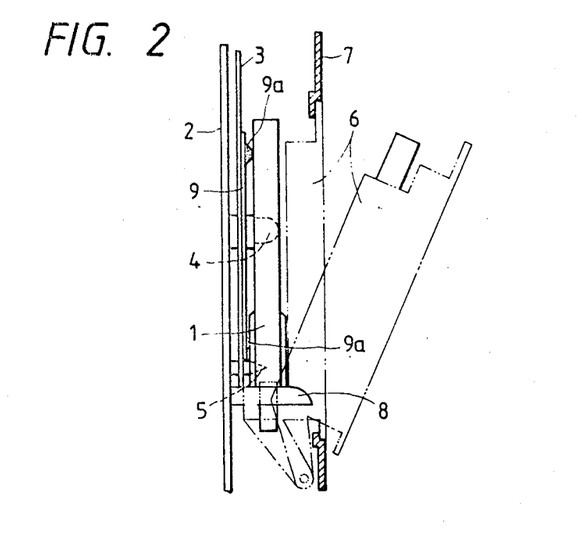
FIG. 2 shows a sectional view of a part of a cassette tape recorder according to the first embodiment of the present invention.
Figure 3:
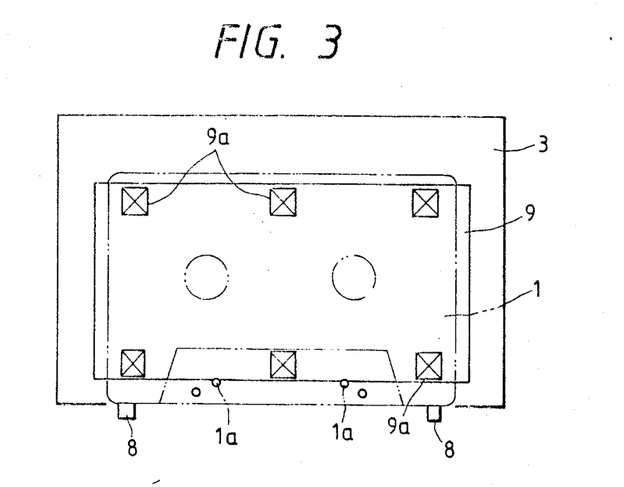
FIG. 3 shows a plan view of a part of the cassette tape recorder according to the first embodiment.
Figure 4:
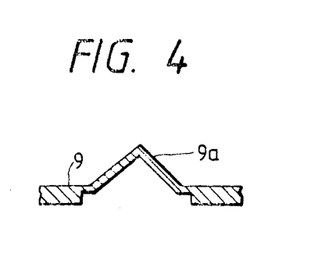
FIG. 4 shows a sectional view of a part of the elastic sheet of the cassette tape recorder according to the first embodiment of the present invention.

FIG. 2 shows a sectional view of a part of the cassette tape recorder in which a cassette 1 is loaded in a tape recorder, and FIG. 3 shows plan view of a part of the tape recorder. In FIG. 2 the cassette tape recorder includes a base plate 2 as a portion of a chassis or the like; a hiding plate 3 provied at the base plate 2 and covering a mechanism provided behind the base plate 2; a reel shaft 4 attached to the base plate 2; a positioning pin 5, whose tip is inserted into the hole 1a (FIG. 3) of the cassette 1 to thereby position the cassette; a door 6 which is of the so-called kangaroo pouch type, and which is rotatably attached to the front panel 7 of the recorder. The door 6 is formed with a housing in which the cassette 1 is placed. The tape recorder shown in FIG. 2 further includes a guide 8 with which the front surface of the cassette 1 (which is placed in the housing) comes into contact at the time of closure of the door 6 so as to guide the cassette towards the reel shaft 4 and the positioning pin 5.

According to the present device, an elastic vibration suppressing sheet 9, such as a rubber sheet, is placed on the hiding plate 3 at the surface thereof which faces the cassette 1. The elastic vibration suppressing sheet 9 is formed with a plurality of projections 9a. Each of the projections 9a is shaped as a quadrangular or triangular pyramid, a cone, or the like. As shown in FIG. 4, the thickness of the elastic sheet 9 may be reduced at the projections 9a relative to the rest of the suppressing sheet 9.

Figure 1:
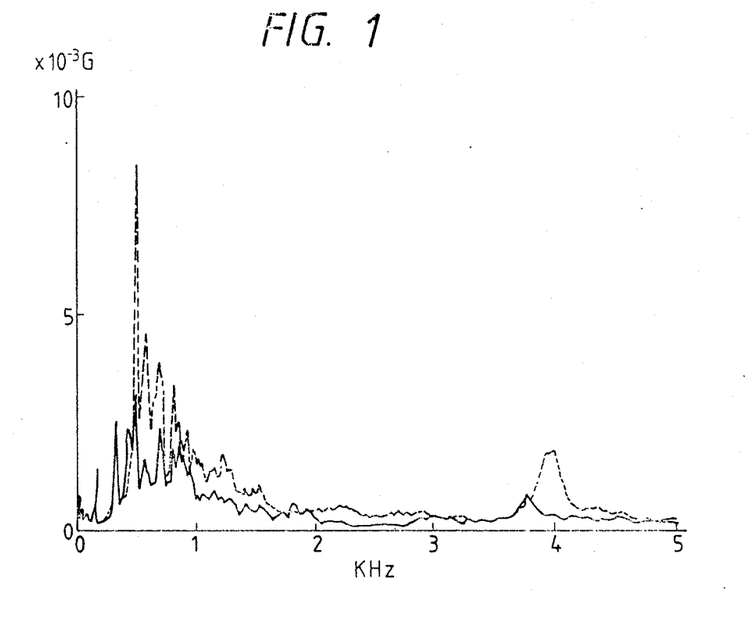
FIG. 1 shows characteristic diagrams of the acceleration versus vibration frequency in a cassette tape recorder according to the first embodiment and in a conventional cassette tape recorder.

When the cassette 1 (placed in the housing of the door 6) is loaded in the cassette tape recorder by closing the door, the flat surface of the cassette comes into point contact with the projections 9a so that the projections are slightly contracted or deformed to thereby push against the cassette 1. As a result, even if a vibration is caused by the rotation of the reel shaft 4 during recording or playback, the vibration which is transmitted to the cassette 1 through the projections 9a is dampened. This is in contrast to conventional tape recorders (i.e., tape recorders having no elastic vibration suppressing sheet) in which the vibration of the reel shaft and the like is directly transmitted to the cassette and is magnified around the frequency of about 500 Hz, as shown by the dotted lines in FIG. 1. The vibration characteristics of the present invention are shown by the full line of FIG. 1. As shown in FIG. 1, the vibration characteristics of the cassette are reduced for all vibration frequencies, and the vibration frequency is especially reduced at a frequency around 500 HZ. Since the vibration characteristics of the cassette is dampened by the vibration suppressing sheet according to the present invention, the cassette 1 does not produce the chatter noise associated with playback and recording of conventional tape recorders, and further, the wow and flutter characteristics of the cassette tape recorder are not deteriorated, thereby increasing the quality of reproduced sound or the like.

A second embodiment of the invention will now be described in connection with FIGS. 5–12.

Figure 5:
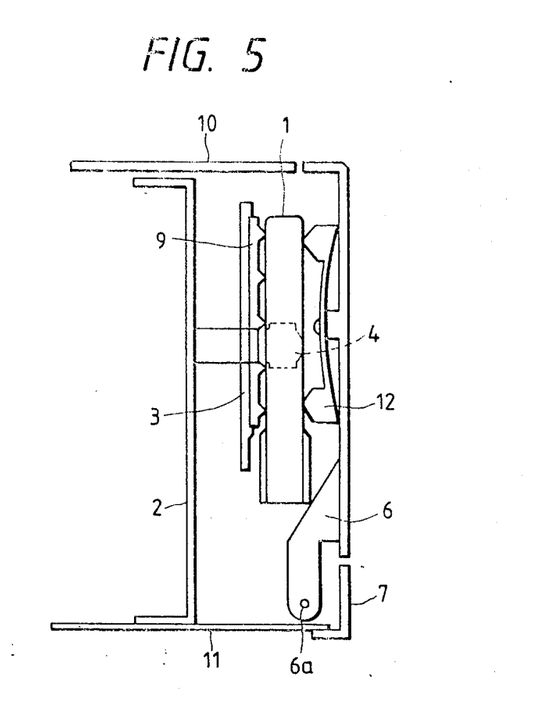
FIG. 5 shows a side view of a cassette stabilizer including the vibration suppressing sheet according to the first embodiment.

FIG. 5 shows a cassette stabilizer for a cassette tape recorder having a vibration suppressing sheet 9 according to the first embodiment. The tape recorder includes a chassis 11, a base plate 2 fitted with a tape running mechanism including a reel shaft 4, and a front panel 7. A door 6 is attached to the front panel 7 by a shaft 6a so that the door 6 can be opened and closed. A cassette hiding plate 3 is fitted with a vibration suppressing sheet 9, as described above in connection with the first embodiment. More particularly, the vibration suppressing sheet 9 is made of an elastic material such as rubber or the like for suppressing vibrations transmitted to the cassette. The suppressing sheet 9 is attached to the hiding plate 3 in the face of the door 6. The cassette stabilizer further includes an elastic push plate 12 provided within the door 6, and a cover 10. When the door 6 (having a cassette 1 inserted into the door when it is opened) is closed, the cassette 1 is set onto the tape running mechanism and pushed by the elastic push plate 12 so that the cassette 1 is placed into pressure contact with the vibration suppressing sheet 9. As a result, the cassette 1 is prevented from undergoing a vibration due to the rotation of a reel or the like as a tape wound on the reel or the like is run by the tape running mechanism.

Although the cassette stabilizer shown in FIG. 5 prevents vibration of the cassette 1, since the cassette 1 is pushed onto the vibration suppressing sheet 9 by the elastic plate 12 at the time of closure of the door 6, the motive power of a motor or the like needs to be high enough to overcome the pushing force of the pushing plate 12. Further, since the cassette 1 is pinched by the vibration suppressing sheet 9 and the elastic push plate 12 before the cassette 1 is set in a proper position by the simultaneous execution of both the pushing of the cassette and the closure of the door 6, the cassette 1 tends to be offset from its proper position at the time of complete closure of the door, and therefore there is insufficient vibration-suppressing action by the suppressing sheet 9.

As will be described presently, the second embodiment of the invention provides a cassette stabilizer in which a push member is not caused to push a cassette while a door is being closed, so that the opening and closing of the door requires less motive power and the cassette is not offset from its proper position.

The second embodiment is hereafter described with referene to FIGS. 6–12.

Referring to FIG. 14, the cassette stabilizer includes a driving motor 20 whose rotation is transmitted to a gear 23 through a speed reduction mechanism. The gear 23 is rotated coaxially with an encoder 22. The rotation of the gear 23 is transmitted to a cam shaft 26 through lateral gears 24 and 25 so that a partially cylindrical cam 27, shaped as a cut-away cylinder, and a peripheral cam 28 are rotated in a direction A.

Figure 6:
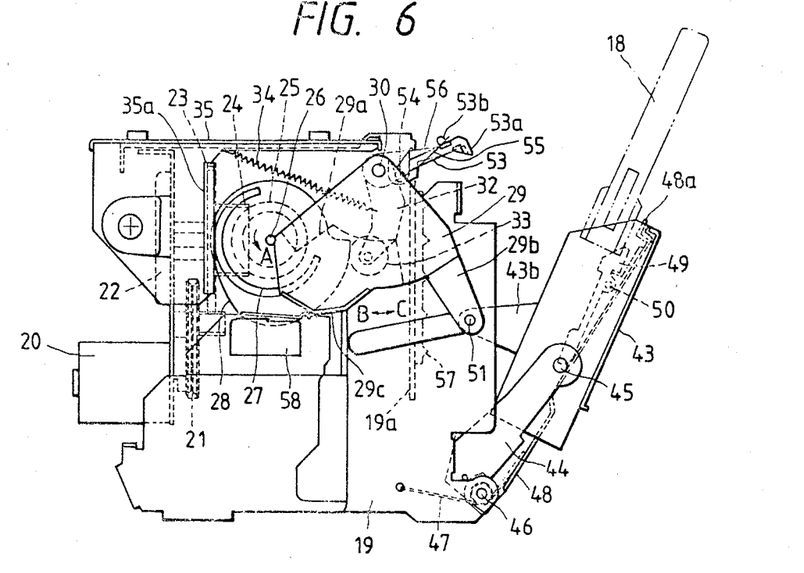
FIG. 6 shows a side view of a cassette stabilizer according to a second embodiment of the present invention which is in the state of having a door opened.

When the contact portion 29a of a turning member 29 which is movably fitted on a shaft 30 is located in the cut-away opening of the partially cylindrical cam 27, the turning member 29 is pulled by a spring 31 (FIG. 9) wound on the shaft 30, so that the turning member 29 is moved in a direction C shown in FIG. 6. When the cut-away edge of the partially cylindrical cam 27 has come into contact with the contact portion 29a of the turning member 29 as a result of the passage of the cut-away opening of the cam, the contact portion 29a is pushed by the cut-away edge so that the turning member 29 turns in a direction B. After that, the contact portion 29a of the turning member 29 is put into frictional contact with the peripheral surface of the partially cylindrical cam 27.

A turning arm 32 is secured to the shaft 30. A roller 33 on the turning arm 32 is located in frictional contact with the outside surface of the peripheral cam 28. The turning arm 32 is pulled by a spring 34 (FIG. 9) attached thereto, so that the turning arm turns in accordance with the form of the peripheral cam 28.

Figure 9:
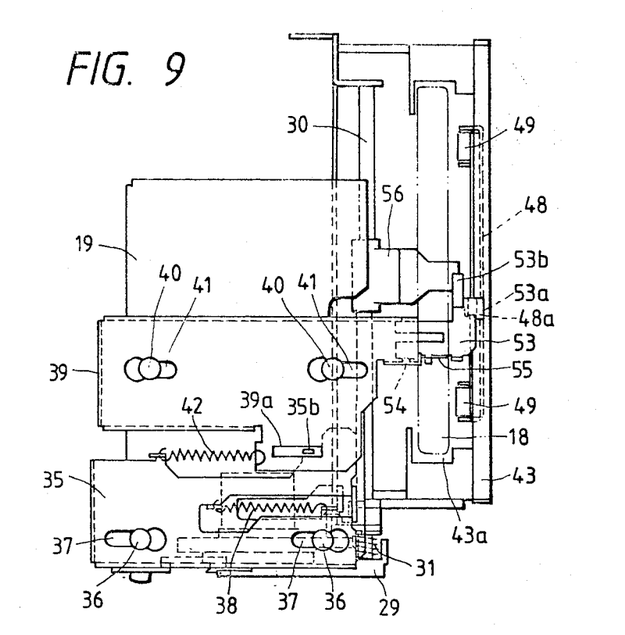
FIG. 9 shows a plan view of the cassette stabilizer according to the second embodiment of the invention.
Figure 10:
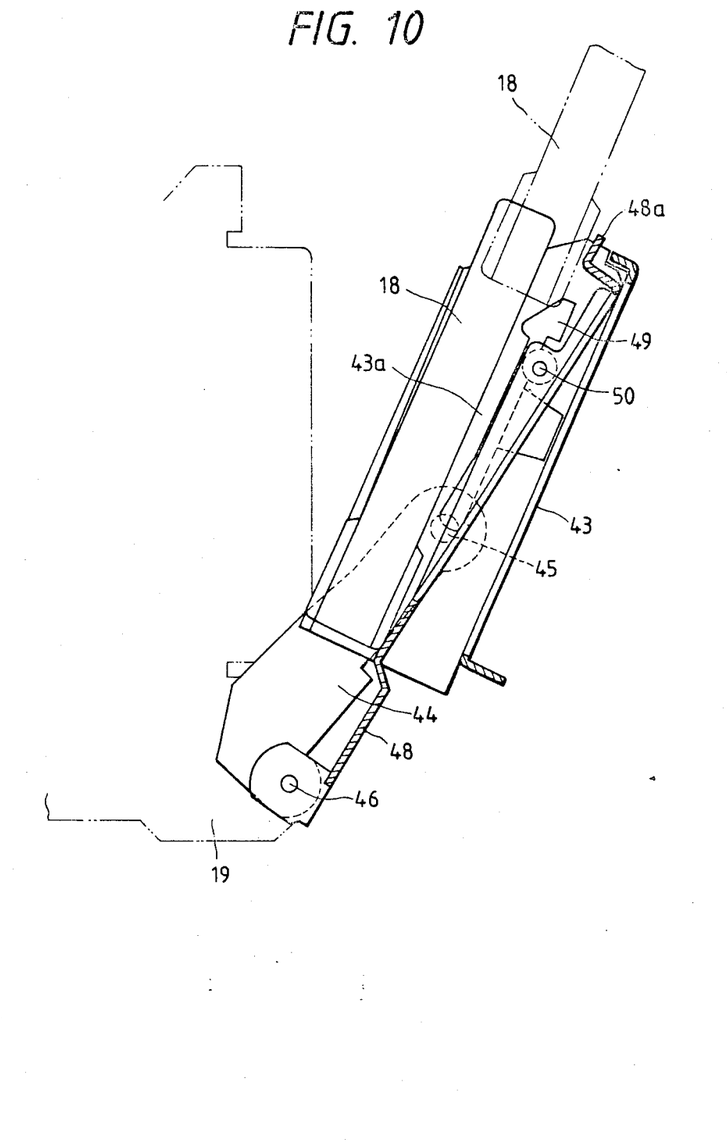
FIG. 10 shows an enlarged sectional view of the door of the stabilizer of the second embodiment.

As shown in FIG. 9, a first arm 35 slides at the slender hole 37 thereof on a pin 36 provided on the top of frame 19. The lower bent portion 35a (FIG. 6) of the first arm 35 is pulled by a spring 38 so that the lower bent portion 35a is located in contact with the peripheral surface of the partially cylindrical cam 27. As a result, the first arm 35 is moved by the pulling action of the spring 38 when the cut-away opening of the partially cylindrical cam 27 moves to the bent portion 35a of the first arm.

A second arm 39 slides at the slender hole 41 thereof on a pin 40 provided on the top of the frame 19. The projecting portion 36b of the first arm 35 is inserted into the hole 39a of the second arm 39. A spring 42 is provided between the first arm 35 and the second arm 39. As a result, the second arm 39 is moved by the pulling action of the spring 42 when the first arm 35 is moved leftward (with regard to FIG. 9). When the first arm 35 is moved rightward (with regard to FIG. 9), the second arm 39 is moved due to the fact that the second arm is pushed at the right-hand side of the hole 39a thereof by the projecting portion 36b of the first arm.

As shown in FIG. 6, a door 43 is supported by the shaft 45 of a coupling arm 44 supported by the shaft 46 of the frame 19. The door 43 is formed with a housing 43a in which a cassette 18 is placed. A push plate 48 is provided in the door 43 and is supported by the shaft 46. A spring 47 wound on the shaft 46 urges the push plate 48 in such a direction as to open the door 43. The push plate 48 has an engaged portion 48a at the top of the plate. A pusher 49, which pushes the cassette 18 by the upper and lower contact portions 49a of the pusher, is supported by a shaft 50. The door 43 is provided with a projecting arm 43b coupled to the arm 29b of the turning member 29 so that the door is opened or closed as the turning member turns.

An engaged member 53, whose engaged portion 53a is engaged with the engaged portion 48a of the push plate 48, is supported by a shaft 54 at the second arm 39. A spring 55 wound on the shaft 54 urges the engaged member 53 in such a direction as to move down the engaged portion 53a thereof. The engaged member 53 has a projection 53b on a push-up member 56 secured to the shaft 30.

A vibration suppressor 57 made of a vibration suppressing material such as rubber according to the first embodiment is stuck to the support portion 19a of the frame 19. The cassette 18 is pinched between the vibration suppressor 57 and the pusher 49 to suppress the vibration of the cassette.

A switch 58 is provided so that when the opening of the door 43 is completed, the switch is pushed into action by the push portion 29c of the turning member 29 to stop the rotation of the motor 20.

The operation of the cassette stabilizer is performed after the closure of the door 43. The playback of the cassette 18 or the like is commanded as the cassette is already inserted from a position (shown by a dotted line in FIG. 10) to another position (shown by a full line in FIG. 10) in the open door. A description of the second embodiment of the invention will now be described when the cassette 18 is positioned in the door (i.e., as shown by the full lines in FIG. 10).

Because of the commanding of playback, the motor 20 is rotated, and the rotation is transmitted to the cam shaft 26 (the speed of rotation of shaft 26 is lower than that of the motor), so that the partially cylindrical cam 27 and the peripheral cam 28 are rotated in the direction A of FIG. 5. As a result, the cut-away edge of the partially cylindrical cam 27 comes into contact with the contact portion 29a of the turning member 29 and pushes it so that the turning member turns in the direction B, and the arm 29b of the member pulls the projecting arm 43b of the door 43. Consequently, the door 43 is turned in such a direction as to be closed.

After the closure of the door 43 is completed, the contact portion 29a of the turning member 29 only slips on the peripheral surface of the partially cylindrical cam 27 so that the turning member 29 does not turn further. Since the spring 47 urges the push plate 48 in such a direction as to open the door 43, in addition to the fact of no further turning of the turning member 29, the pusher 49 does not push the cassette 18.

Figure 7:
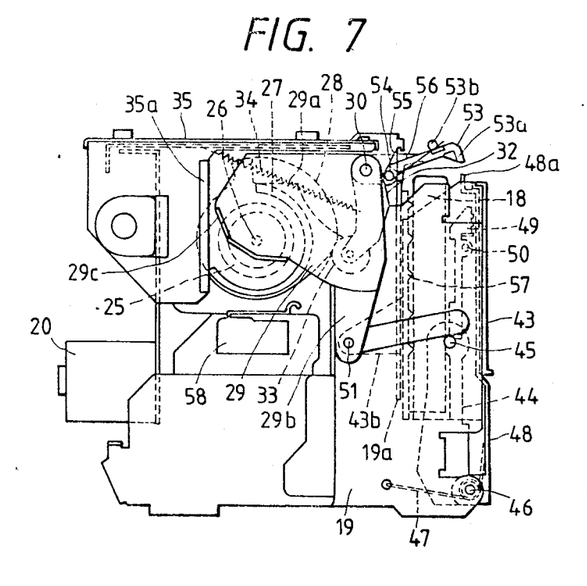
FIG. 7 shows a side view of the cassette stabilizer according to the second embodiment of the invention, wherein the pusher of the stabilizer has not yet been shoved against the cassette.

When the cam shaft 26 has rotated further so that a state shown in FIG. 7 is produced, the cut-away portion of the partially cylindrical cam 27 reaches the position of the bent portion 35a of the first arm 35 so that the first arm is moved rightward (with regard to FIG. 7) by the pulling action of the spring 38 to push the second arm 39 at the right-hand side of the hole 39a thereof by the projecting portion 36b of the first arm to move the second arm rightward as well. As a result, the engaged member 53 supported by the shaft 54 of the second arm 39 is also moved rightward. At that time, the roller 33 and the oblique surface of the peripheral cam 28 are engaged with each other so that the turning arm 32 turns in the direction B (FIG. 6) due to the pulling action of the spring 34. The turning of the arm 32 is transmitted to the shaft 30 to turn the tip of the push-up member 56 in such a direction as to move down the tip. As a result, the engaged portion 53a of the engaged member 53 is moved down because of the urging action of the spring 55. On account of the rightward movement of the engaged member 53 and the downward movement of the engaged portion 53a thereof, the engaged portion 53a of the engaged member 53 reaches a position in which the portion 53a is engaged with the engaged portion 48a of the push plate 48 as shown in FIG. 8.

Figure 8:
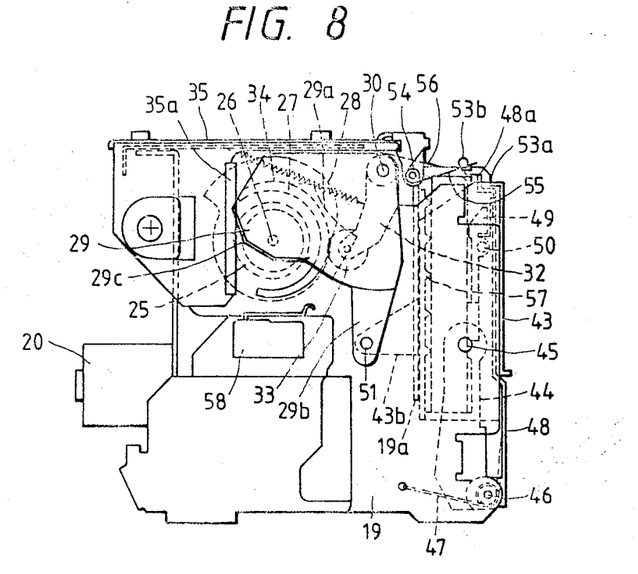
FIG. 8 shows a side view of the cassette stabilizer according to the second embodiment, wherein the pusher has not yet been shoved against the cassette.

When the cam shaft 26 has rotated yet further as shown in FIG. 8, the bent portion 35a of the first arm 35 is pushed by the cut-away portion of the partially cynlidrical cam 27 so that the first arm is moved leftward (with regard to FIG. 9) against the force of the spring 38. The leftward movement of the first arm 35 is transmitted to the second arm 39 by the spring 42 to move the second arm leftward (with regard to FIG. 9) and to move the engaged member 53 rightward and leftward. As a result, the engaged portion 53a of the engaged member 53 turns the push plate 48 against the force of the spring 47 so that the pusher 49 attached to the push plate 48 shoves the cassette 10 onto the vibration suppressor 57 to suppress the vibration of the cassette. The quantity of the movement of the first arm 35 in the case is larger than an amount necessary to enable the pusher 49 to shove the cassette 18 through the action of the engaged member 53 and that of the push plate 48. The excess of the quantity of the movement over the amount necessary is absorbed by elongation of the spring 42 so that the cassette 18 is securely shoved by the pusher 49.

When the door 43 is to be opened to take the cassette 18 out, an "eject" command is given to rotate the motor 20 in reverse to operate the cassette stabilizer in the sequence opposite to that of the above-described operation. As a result of the reverse sequence, the door 43 is opened so that the cassette 18 may be taken out.

Figure 11A:
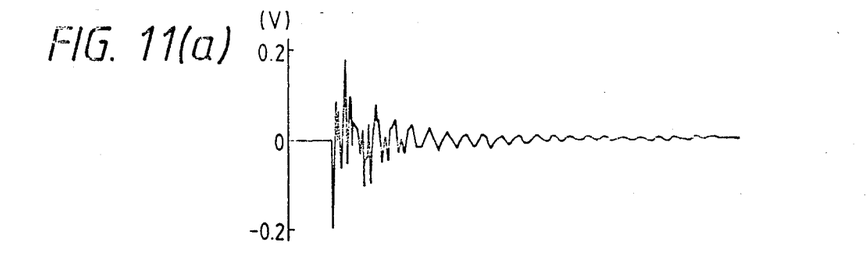
FIGS. 11(A) and 11(B) show a diagram of the vibration damping characteristic of a conventional cassette stabilizer, and a diagram of the cassette stabilizer according to the second embodiment, respectively.
Figure 11B:
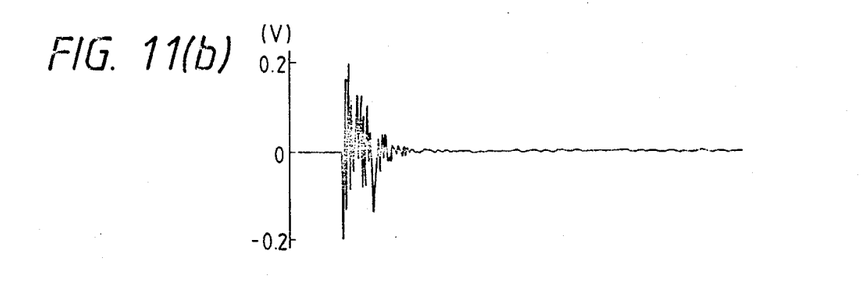

Since the cassette 18 is shoved onto the vibration suppressor 57 by the pusher 49 as mentioned above, the vibration of the cassette is damped as shown in FIG. 11(b). If the cassette stabilizer is not provided, it takes more time for the vibration of the cassette 18 to be damped, as shown in FIG. 11(a). Therefore, it is understood that the vibration of the tape recorder is absorbed in a shorter time by the cassette stabilizer according to the present invention.

Figure 12:
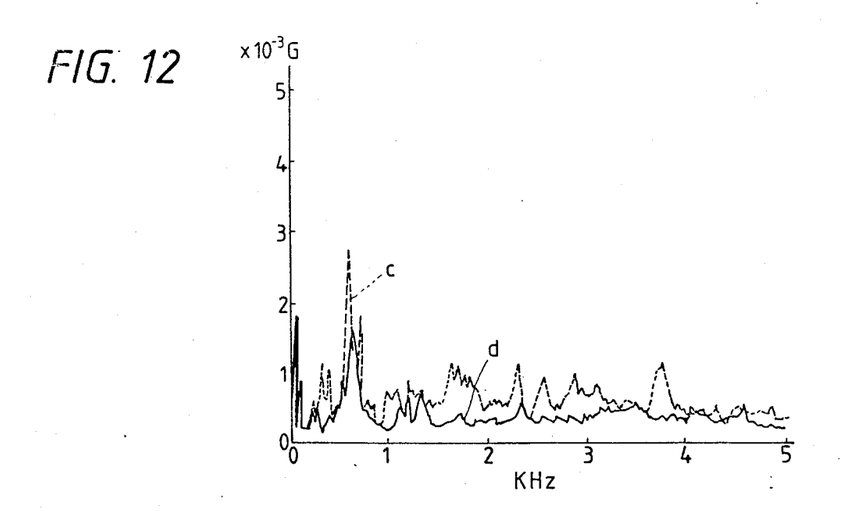
FIG. 12 shows diagrams of the vibration frequency characteristics of both the conventional cassette stabilizer, and the cassette stabilizer according to the present invention.

FIG. 12 shows a waveform (c) indicative of the vibratory characteristic of the cassette 18 without the cassette stabilizer, and waveform (d) is indicative of the vibration of the cassette with the cassette stabilizer according to the present invention. It is understood from FIG. 12 that the vibration of the cassette 18 with the cassette stabilizer is less than that of the cassette without the cassette stabilizer, at every frequency.

According to the second embodiment of the present invention, a cassette set on a tape running mechanism is shoved by a push member to suppress the vibration or resonance of the cassette, thereby preventing the deterioration of the frequency characteristics of reproduced sound. Further, since the cassette is not shoved by the push member while a door housing the cassette is being closed to set the cassette on the tape running mechanism, the cassette is set in a proper position on the tape running mechanism. After the cassette is set in the proper position on the tape running mechanism, the cassette is shoved by the push member so that the cassette receives a vibration suppressing action when the cassette is in the proper position. Further, since the push member remains aside when the cassette is inserted into the housing of the door, it is easy to insert the cassette into the door housing, and since the cassette is not shoved while the door is being closed, the door can be easily and smoothly closed by a lower amount of motive power.

What is claimed is:

1. In a cassette tape recorder of the type having a recess for loading a cassette, a hiding plate located at the back of the recess for hiding an internal mechanism of the tape recorder, the hiding plate having means for positioning the cassette thereon and for moving the tape within the cassette during a playback/recording operation of the recorder, and means for pushing the cassette against the hiding plate, the improvement comprising:
    an elastic sheet, located on the surface of said hiding plate, for preventing vibration of the cassette which occurs during the playback/recording operation of the recorder.

2. The tape recorder according to claim 1, wherein the surface of said elastic sheet which faces the cassette has a plurality of projections.

3. The tape recorder according to claim 2, wherein said plurality of projections are each shaped as a quadrangular pyramid.

4. The tape recorder according to claim 2, wherein said plurality of projections are each shaped as a triangular pyramid.

5. The tape recorder according to claim 2, wherein said plurality of projections are each shaped as a cone.

6. The tape recorder according to claim 2, wherein the thickness of said elastic sheet is reduced at the projections.

7. The tape recorder according to claim 1, wherein said elastic sheet consists of rubber.

8. A cassette tape recorder stabilizer having a recess for loading a cassette, a hiding plate located at the back of the recess for hiding an internal mechanism of the tape recorder, the hiding plate having means for positioning the cassette thereon and for moving the tape within the cassette during a playback/recording operation of the recorder, said stabilizer comprising:
    a door having a housing for supporting the cassette;
    means for opening and closing said door;
    a pushing member provided in said housing, said pushing member being operable for pushing the cassette placed therein against the hiding plate;
    a pulling coupler which is disengaged from said pushing member when said door is opened, and which is engaged with said pushing member after said door is closed for shoving said pushing member onto said cassette after said door is closed; and
    an elastic sheet located on the surface of the hiding plate for preventing vibration of the cassette which occurs during the playback/recording operation of the recorder.

9. The tape recorder according to claim 8, further comprising a motor for operating said opening and closing means.

10. The tape recorder according to claim 9, further comprising means for causing said pulling coupler to perform the engaging and disengaging actions in response to rotation of said motor.

11. The tape recorder according to claim 8, wherein said elastic sheet contains a plurality of projections.

12. The tape recorder according to claim 8, wherein said pulling coupler is engaged with said pushing member when the cassette is placed in a proper position in the tape recorder.

13. The tape recorder according to claim 8, wherein said pulling coupler includes an engaging member, and wherein said pushing member includes a receiving portion for receiving said engaging member, said engaging member being engaged with the receiving portion of said pushing member when said door is closed so that said pushing member pushes against the cassette.

14. The tape recorder according to claim 13, further comprising a spring for urging said pushing member in a direction to open the door, said engaging member being operable, when said door is closed, for engaging the receiving portion of said pushing member and for turning said pushing member against the force of said spring so that said pushing member pushes against the cassette.

* * * * *